US006323631B1

(12) United States Patent
Juang

(10) Patent No.: US 6,323,631 B1
(45) Date of Patent: Nov. 27, 2001

(54) CONSTANT CURRENT DRIVER WITH AUTO-CLAMPED PRE-CHARGE FUNCTION

(75) Inventor: Dar-Chang Juang, Hsinchu (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 0 days.

(21) Appl. No.: 09/761,685

(22) Filed: Jan. 18, 2001

(51) Int. Cl.[7] .......... G05F 1/40

(52) U.S. Cl. .......... 323/315

(58) Field of Search .......... 323/312–315; 327/535, 537, 538

(56) References Cited

U.S. PATENT DOCUMENTS 5,473,270 * 12/1995 Denker .......... 326/95
5,886,566 * 3/1999 Park et al. .......... 327/536
6,043,525 * 3/2000 Chen .......... 257/292

* cited by examiner

*Primary Examiner*—Matthew Nguyen
(74) *Attorney, Agent, or Firm*—Bacon & Thomas, PLLC

(57) ABSTRACT

A constant current driver with auto-clamped pre-charge function includes a reference bias generator and a plurality of constant current driver cells, each being connected to the reference bias generator to form a respective current mirror. Each constant current driver cell has a switch transistor, a current output transistor and a pre-charge transistor. When a constant current is outputted from the current output transistor for driving an organic light emitting diode, the pre-charge transistor is turned on to provide a drain to source current as an additional large current for rapidly pre-charging the organic light emitting diode until the gate to source voltage of the pre-charge transistor is smaller than the threshold voltage.

14 Claims, 12 Drawing Sheets

CONSTANT CURRENT DRIVER WITH AUTO-CLAMPED PRE-CHARGE FUNCTION

BACKGROUND OF THE INVENTION

1. Field of the Invention

The present invention relates to a circuit for driving the organic light emitting diode (OLED) display panel and, more particularly, to a constant current driver with auto-clamped pre-charge function.

2. Description of Related Art

The organic light emitting diode (OLED) is known as an organic thin film semiconductor based light emitting device. Thus, a display panel can be provided by a two-dimensional array of OLEDs.

In general, an OLED panel may be driven by a constant voltage, which is deemed to be less energy consumed. However, because the cut-in voltages of the OLEDs on the display panel are not uniform, each OLED may de conducted in different voltage level, which results in that the emitted light is not even.

Furthermore, it is known that the light intensity of the OLED is proportional to the current generated by combining the electrons and holes at the junction area. This current is an exponential function of the junction voltage, so that it is very sensitive to the variance of the junction voltage. Hence, in order to achieve a uniform light intensity of the whole OLED array, it is preferable to drive the OLED panel by constant current.

FIG. 8 is a system architecture showing the conventional constant current driven OLED display panel and the driver. As shown, the driver includes a column driving circuit 81 and a row driving circuit 82. The column driving circuit 81 includes a reference bias generator 811 and a plurality of constant current column driver cells 812. FIG. 9 is a detailed circuit diagram of the column driving circuit 81. The reference bias generator 811 is coupled to each constant current column driver cell 812 to form a current mirror, so as to turn on the switch transistor MPS based on an input from a column data shift register 83 via an input terminal COLI, thereby an output transistor MPO providing a constant current output on the output terminal COLO. Furthermore, a discharge transistor MND, controlled by a discharge control terminal DIS, is provided in each constant current column driver cell 812 for eliminating the possible residual image caused by the junction capacitance and the wiring stray capacitance of OLEDs. The discharge transistor MND is turned on for a short period of time before the driving current is applied, so as to leak out the charge stored in the junction capacitors and the wiring stray capacitors of OLEDs.

With reference to FIG. 8 again, the row driving circuit 82 includes a plurality of inverters 821 connected to a row scanning shift register 84. Hence, under the control of the synchronous signals (HSYNC and VSYNC) and clock signal (HCLK), current from the output terminal COLO of a selected constant current column driver cell 812 is outputted to the OLEDs of a corresponding column. Furthermore, a selected inverter 821 drains the conducting current of a row of OLEDs, so as to turn on the desired OLEDs to emit light.

In a typical application, only dozens of micro amperes (e.g., 25 $\mu$A) of driving current is sufficient for driving a pixel having a size of 0.1 $mm^2$ to emit a required light intensity under a 1/64 duty cycle operating condition. However, taking a 64×64 OLED display panel as an example, a parasitic capacitance of several hundreds pico farads (e.g., 600 pF) may be generated from the stray capacitor on the thin film electrode layout and the junction capacitance of the diode array in driving each pixel. Therefore, if the constant current driving circuit as shown in FIG. 8 is employed for driving, the parasitic capacitor is charged by the driving current at first. As shown in FIG. 10, in a driving duration of about 200 micro seconds ($\mu$s), it takes about 150 $\mu$s to charge the OLED to have an enough voltage (e.g., about 7V) for conducting a current of about 25 $\mu$A at the junction. Therefore, the actual duration for emitting light is greatly reduced, and the intensity of emitting light is not satisfactory.

To eliminate such a problem, a pre-charge capability is provided in the constant current driving circuit. A known driver with pre-charge circuit is shown in FIG. 11, wherein the gate of a PMOS transistor MPPRE, which is used as a pre-charge device, is temporarily grounded at the front edge of a driving period by a switch, so as to generate a large current in a short period of time rapidly charging a stray capacitor to a high voltage. However, such a design suffers from several disadvantages. With reference to FIG. 12, the first disadvantage is that the voltage of stray capacitor may be over-charged, resulting in a much larger junction current generated in OLED as compared to the predetermined driving current at this time period. The second disadvantage is that the over-charged voltage of the stray capacitor may be slowly discharged through OLED after the pre-charge process, resulting in a junction current being difficult to control. Particularly, the pre-charge process may produce a product of large current and time, i.e., a considerable amount of constant charge. As a result, it is difficult to adjust the driving current for obtaining a desired intensity of display panel. The third disadvantage is that an independent pre-charge control pulse signal with a very small width is required for alleviating the problem of uneven light emission caused by the first disadvantage. In view of above, the conventional constant current OLED drivers are not satisfactory, and thus there is a need to have an improved constant current driver to mitigate and/or obviate the aforementioned problems.

SUMMARY OF THE INVENTION

An object of the present invention is to provide a constant current driver with auto-clamped pre-charge function, which allows the OLED display panel to emit light uniformly without the need of an additional pre-charge signal, thus eliminating the drawbacks of the conventional OLED driver.

Another object of the present invention is to provide a constant current driver with auto-clamped pre-charge function, which can be switched into a voltage driven mode by a multiplexer, so as to be used in an application requiring a low energy consumption, instead of requiring uniform light illumination.

According to one aspect, the present invention which achieves these objects relates to a constant current driver with auto-clamped pre-charge function, which comprises: a reference bias generator having a bias output terminal for providing a reference bias; and a plurality of constant current driver cells, each being connected to the reference bias generator to form a respective current mirror. The constant current driver cell comprises: a switch transistor controlled by an input terminal for being turned on or off; a current output transistor connected to the switch transistor and the bias output terminal of the reference bias generator for outputting a constant current when the switch transistor is on; and a pre-charge transistor having a gate connected to the gate of the current output transistor and further connected to the bias output terminal of the reference bias generator, a drain and a source connected to the drain and source of the current output transistor, respectively, whereby, when a constant current is outputted from the current output transistor for driving an organic light emitting diode, the pre-charge transistor is turned on due to the gate to source voltage thereof being larger than its threshold voltage, so as to provide a drain to source current as an additional large current for rapidly pre-charging the organic light emitting diode until the gate to source voltage of the pre-charge transistor is smaller than the threshold voltage.

According to another aspect, the present invention which achieves these objects relates to a constant current driver with auto-clamped pre-charge function, which comprises: a reference bias generator having a bias output terminal for providing a reference bias; and a plurality of constant current driver cells, each being connected to the reference bias generator to form a respective current mirror. The constant current driver cell comprises: a switch transistor controlled by an input terminal for being turned on and off; a current output transistor connected to the switch transistor and the bias output terminal of the reference bias generator; and a diode array having an anode and a cathode connected to the drain and the source of the current output transistor, respectively, wherein when a constant current is outputted from the current output transistor to drive an organic light emitting diode, the diode array is turned on for providing an additional large current to rapidly pre-charge the organic light emitting diode until the voltage of the diode array is smaller than its cut-in voltage.

According to yet another aspect, the present invention which achieves these objects relates to a constant current driver with auto-clamped pre-charge function, wherein a multiplexer is connected between the bias output terminal of the reference bias generator and the connection point of the gates of the pre-charge transistor and the current output transistor of the constant current driver cell. The first and second input terminals of the multiplexer are connected to the bias output terminal of the reference bias generator and ground respectively, and the output terminal of the multiplexer is connected to the gates of the pre-charge transistor and the current output transistor, so as to switch the driving circuit to a constant current or a constant voltage driving mode. Other objects, advantages, and novel features of the invention will become more apparent from the detailed description when taken in conjunction with the accompanying drawings.

DETAILED DESCRIPTION OF THE PREFERRED EMBODIMENT

Figure 1:
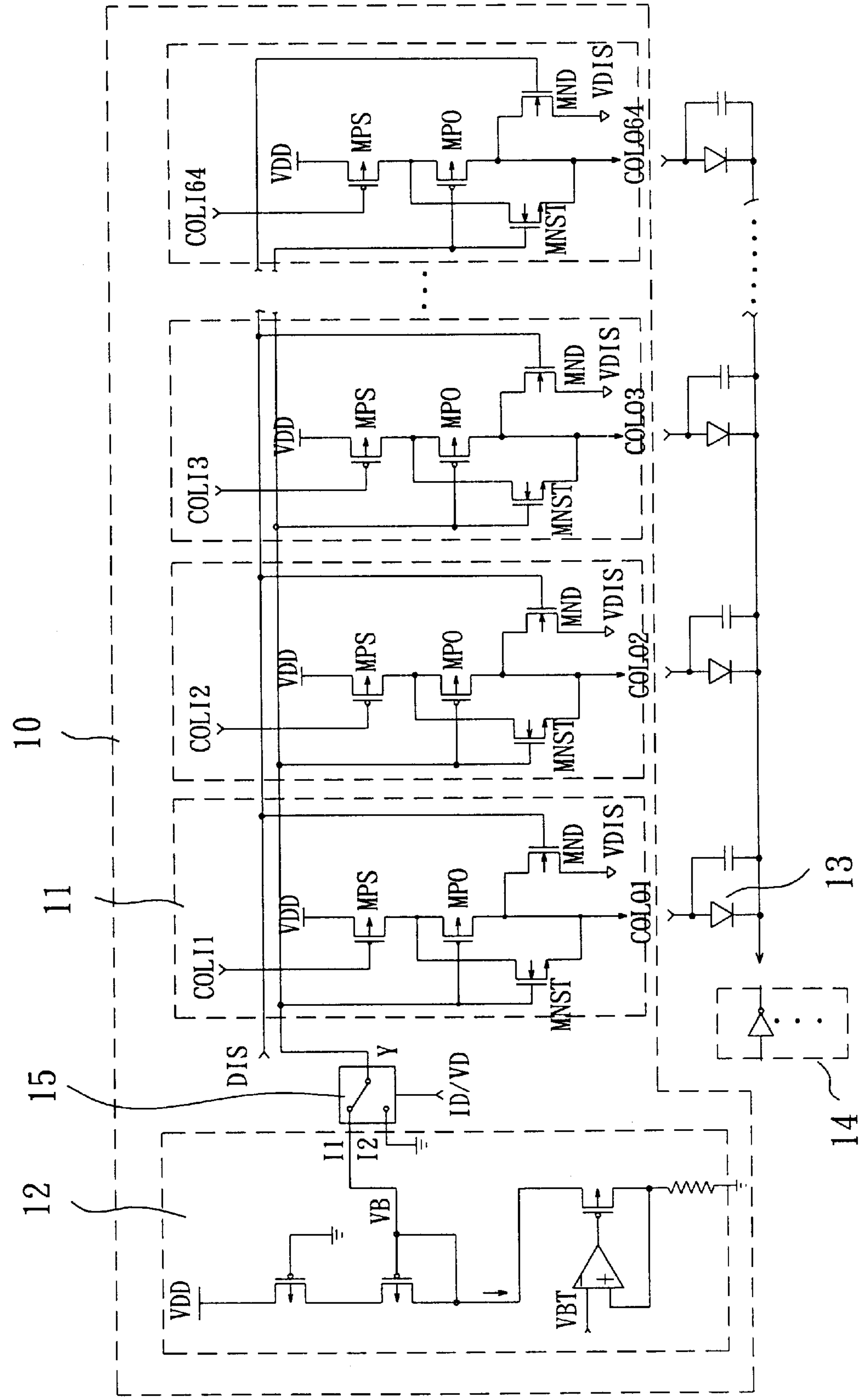
FIG. 1 is a circuit diagram of a first preferred embodiment of constant current driver with auto-clamped pre-charge function in accordance with the present invention.

With reference to FIG. 1, there is shown the constant current driver with auto-clamped pre-charge function in accordance with a preferred embodiment of the present invention. As shown, the column driving circuit 10 includes a plurality of constant current driver cells 11 and a reference bias generator 12 coupled to a respective constant current driver cell 11 to form a current mirror. The constant current driver cell 11 includes a PMOS transistor MPS, which is used as a switch, and a PMOS transistor MPO, which is used as a current output device, connected to the transistor MPS. The source of transistor MPS is connected to the voltage VDD, the drain thereof is connected to the source of transistor MPO, and the gate thereof is connected to the input terminal COLI. The gate of transistor MPO is connected to the bias output terminal VB of the reference bias generator 12, and the drain thereof is connected to the output terminal COLO. Hence, when the input terminal COLI is of a low voltage level, the PMOS transistor MPS is turned on. As a result, PMOS transistor MPO outputs a constant current on the output terminal COLO.

The constant current driver cell 11 also includes an NMOS transistor MND, used as a pre-charge device, which has a drain connected to the drain of transistor MPO, a source connected to the discharge voltage VDIS, in which the discharge VDIS is set to the system's zero voltage or a predetermined voltage for a specific application, and a gate connected to a discharge control terminal DIS, so that, when discharge control terminal DIS is of a high voltage level, transistor MND is turned on to perform a discharge.

In order to provide an auto-clamped pre-charge capability, the present invention utilizes an NMOS transistor MNST, which is used as a pre-charge device, to connect to the current output transistor MPO in parallel, so as to form a source follower. That is, the gate of transistor MNST is connected to the gate of transistor MPO, and further connected to the bias output terminal VB. The drain of transistor MNST is connected to the drain of transistor MPO, and further connected to the output terminal COLO. The source of transistor MNST is connected to the source of transistor MPO, and further connected to the voltage VDD via the switch transistor MPS, which is controlled by input terminal COLI.

Figure 2:
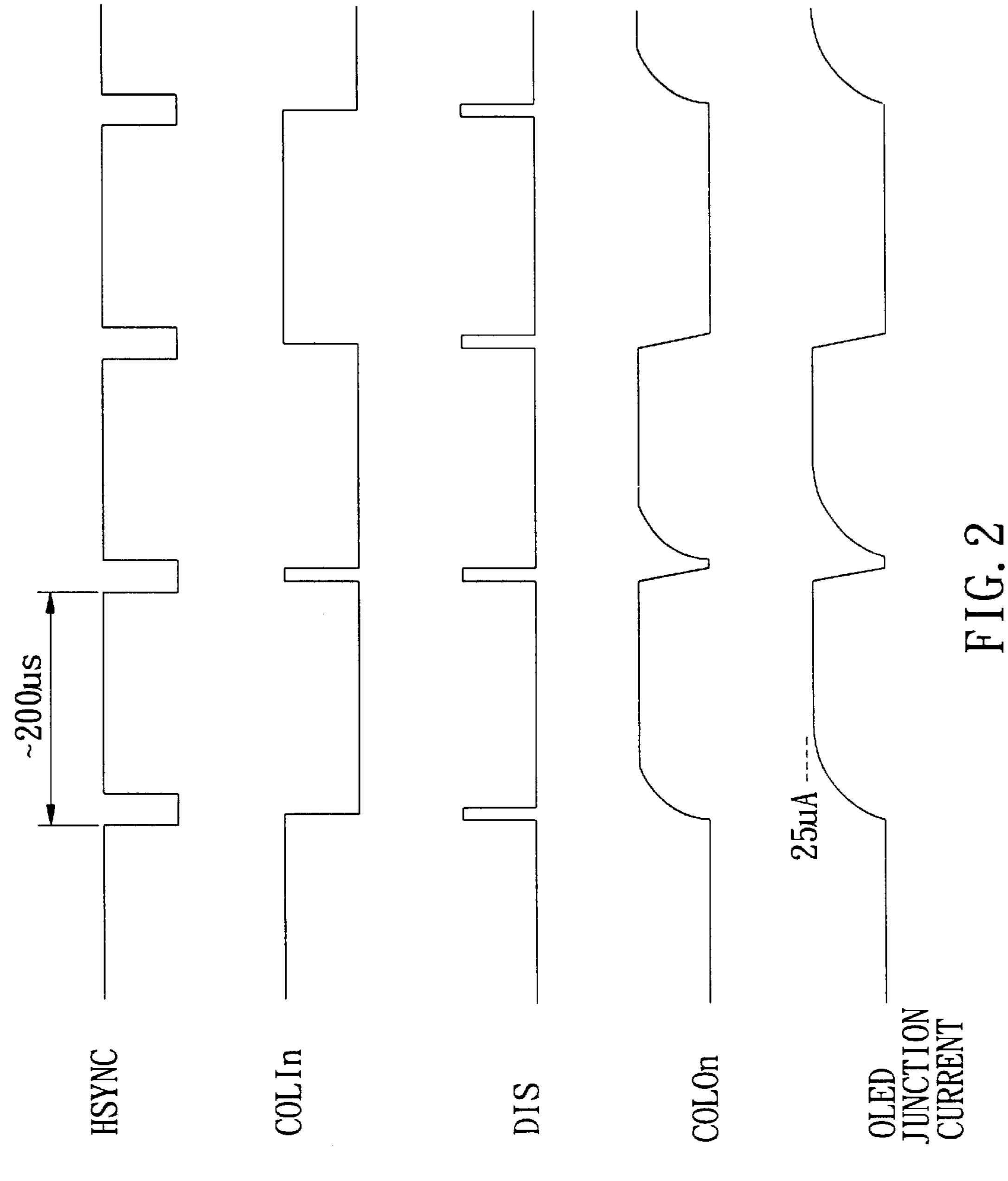
FIG. 2 depicts the driving waveforms of the circuit shown in FIG. 1.

Also with reference to FIG. 2, there is shown the driving waveforms. In the design of the driver, the DIS signal will be pulled to $V_{DD}$ for a short period of time (e.g., about 10 to 20 $\mu$s) before driving each horizontal line, so as to discharge the junction capacitors and wiring stray capacitors of OLEDs in the corresponding column, thereby rapidly eliminating the residual image effect. Afterwards, the constant current driver cell 11 is controlled by the corresponding column data to determine whether to output current or not. If it is determined to output current, PMOS transistor MPO will output a constant current of 25 $\mu$A. At this time, the voltage of the OLED 13 to be driven is still 0V, a low voltage level, or even a negative voltage level. Because the gate to source voltage of transistor MNST $V_{GS}$=bias voltage VB−the voltage of OLED $V_{OLED}$. Thus, $V_{GS}$ is greater than the threshold voltage Vth of transistor MNST, so that the pre-charge transistor MNST will be turned on and the drain to source current $I_{DS}$ of transistor MNST (which is proportional to the square value of ($V_{GS}$−Vth)) is provided as additional large current for rapidly pre-charging the OLED 13 to be driven. Thus, voltage $V_{OLED}$ is rapidly charged until $V_{GS}$ is smaller than Vth. Furthermore, when considering the voltage drop of the row driving circuit 14, the pre-charge circuit is automatically disabled after ($V_{OLED}$+ the voltage drop of row drive circuit 14)>(VB−Vth). That is, a clamping on the pre-charge circuit is occurred, so as to stop pre-charging. As a result, only a 25 $\mu$A constant current outputted from transistor MPO is used to drive the corresponding OLED 13 and stray capacitor.

In the embodiment shown in FIG. 1, a multiplexer 15 is used as a single-pole double-throw switch for bias control. The multiplexer 15 is connected between the bias output terminal VB of reference bias generator 12 of the column driving circuit 10 and the gates of transistors MNST and MPO of the constant current driver cells 11. The first input terminal I1 and second input terminal I2 of the multiplexer 15 are coupled to the bias output terminal VB and ground respectively. The output terminal Y of the multiplexer 15 is connected to the gates of transistors MNST and MPO respectively. When control signal ID/VD of the multiplexer 15 is one, the output terminal Y is switched to the first input terminal 11, so that the gate of transistor MNST of constant current driver cell 11 is connected to the bias output terminal VB. Such a circuit configuration is the same as the previous embodiment, which is known as a constant current driving mode. When the control signal ID/VD of multiplexer 15 is zero, the output terminal Y is switched to second input terminal I2, and thus the gates of transistors MST and MPO of the constant current driver cell 11 are connected to ground (i.e., 0V). Hence, transistor MNST is forced to be turned off and transistor MPO is forced to be turned on and behaves as a low resistor. Thus, such a driving unit is served as a constant voltage driving circuit. Accordingly, the user may select a desired driving mode of the driver in accordance with the present invention depending on a specific application thereby achieving the maximum benefits with the minimum cost.

Figure 3:
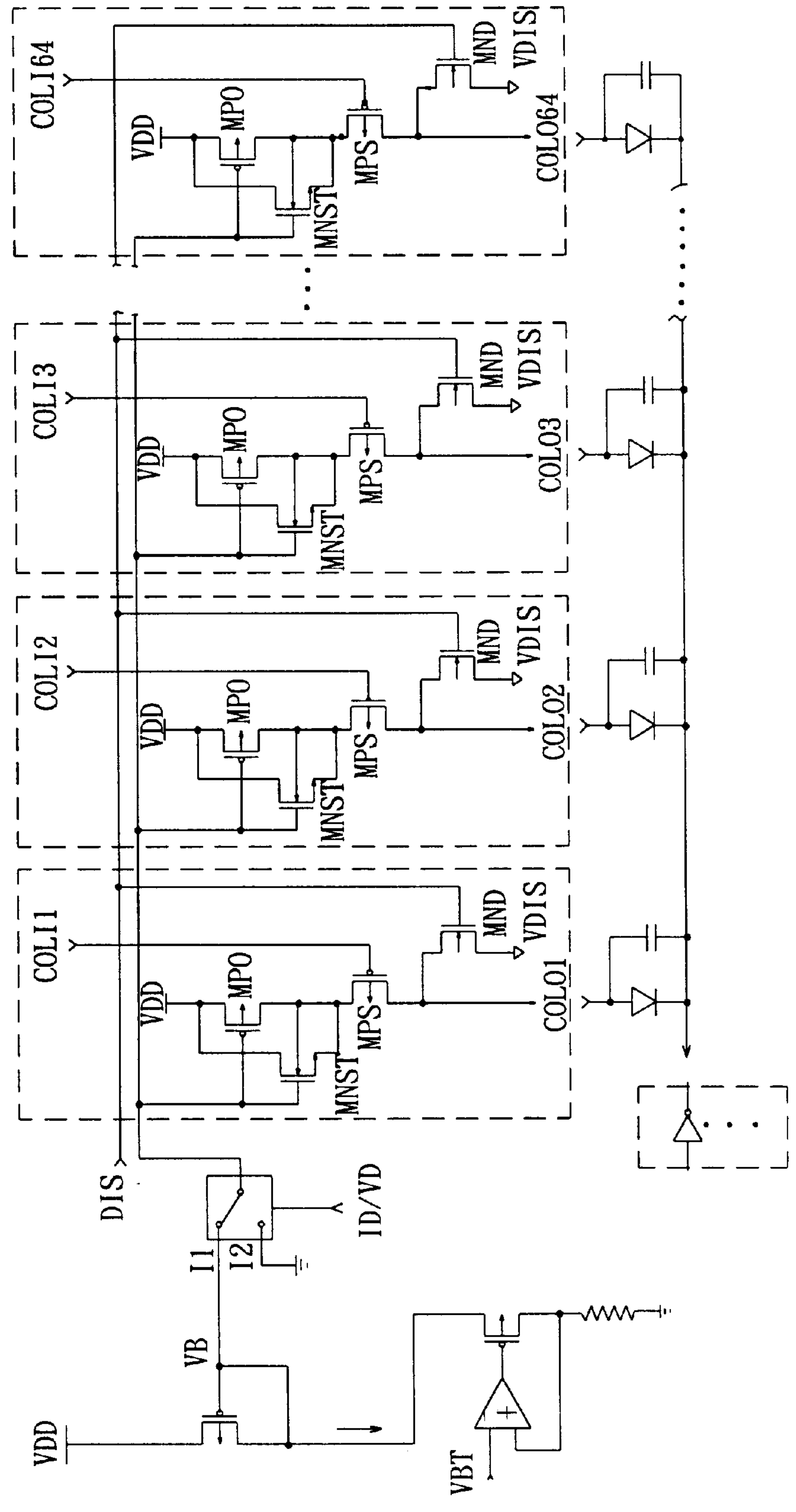
FIG. 3 is a circuit diagram of a second preferred embodiment of constant current driver with auto-clamped pre-charge function in accordance with the present invention.

FIG. 3 is the circuit diagram of a second preferred embodiment in accordance with the present invention, which is similar to the previous embodiment except that the PMOS switch transistor MPS is connected between the connection point of the source of transistor MNST and the drain of transistor MPO and the driving output terminal. That is, the source of transistor MPO is connected to the supply voltage $V_{DD}$, the drain thereof is connected to the source of transistor MPS, and the gate thereof is connected to the bias output terminal I2 of the reference bias generator VB. The gate of transistor MPS is connected to the input terminal COLI and the drain thereof is served as a constant current output terminal COLO. Furthermore, the drain of transistor MND is connected to drain of transistor MPS, the source thereof is connected to discharge voltage $V_{DIS}$, an d the gate thereof is served a s a discharge control terminal DIS. Moreover, the drain of transistor MNST is connected to the output terminal COLO through transistor PS, and both the sources of transistors MNST and MPO are connected to the supply voltage $V_{DD}$. With such a circuit configuration, the second embodiment can achieve the same advantages as the first one.

Figure 4:
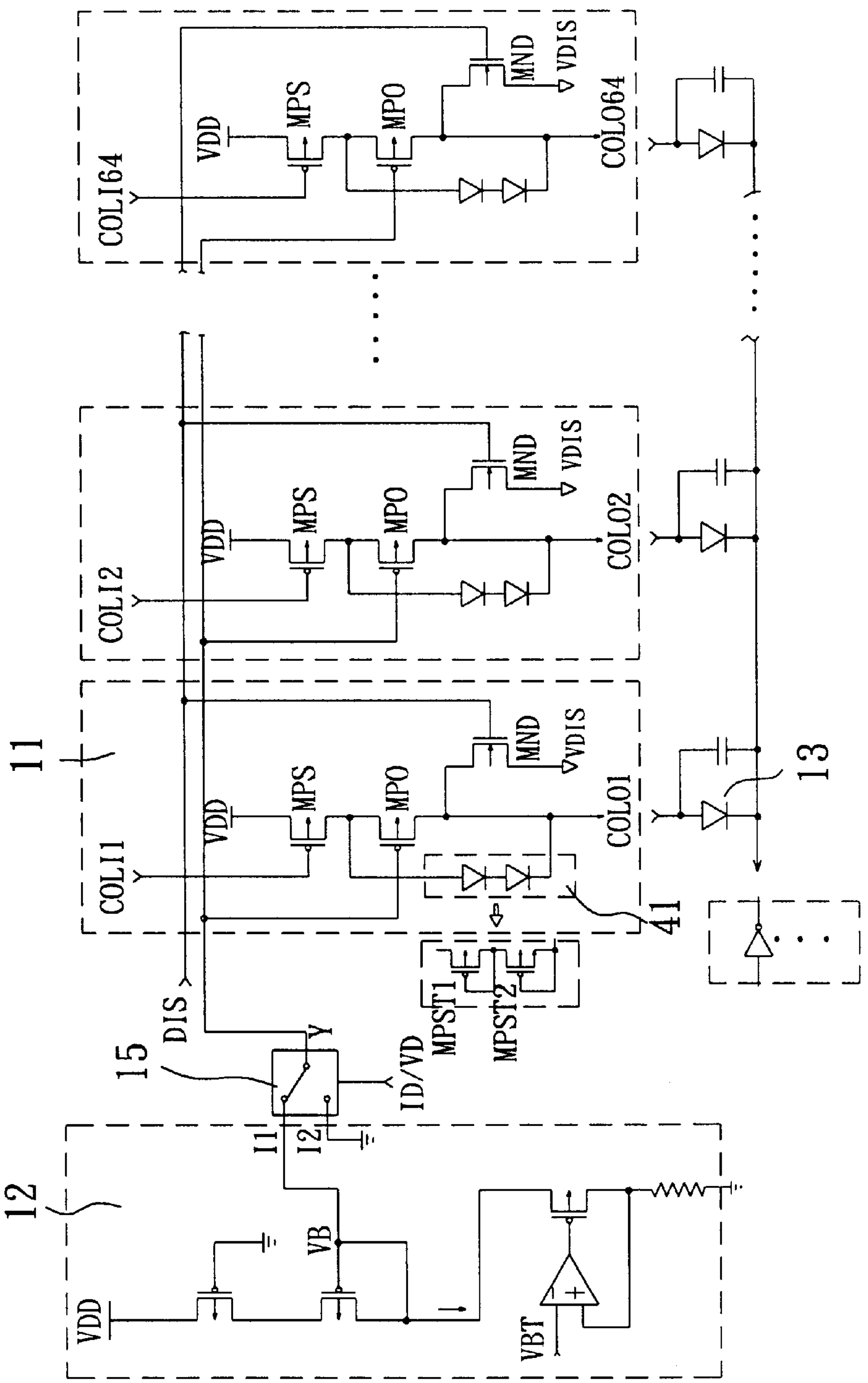
FIG. 4 is a circuit diagram of a third preferred embodiment of constant current driver with auto-clamped pre-charge function in accordance with the present invention.

In other preferred embodiments of the present invention, the auto-clamped pre-charge function is achieved by using diode arrays. FIG. 4 is a circuit diagram of a third preferred embodiment in accordance with the present invention. As shown, similar to the above embodiments, the constant current driver cell 11 of the column driving circuit also comprises a PMOS transistor MPS used as a switch device, a PMOS transistor MPO used as a voltage output device, and a NMOS transistor MND used as a discharge device. The gate of PMOS transistor MPO is connected to the bias output terminal VB of a reference bias generator 12 for forming a constant current output device. The difference between this embodiment and the above ones is that a diode array 41 is connected to transistor MPO in parallel, wherein the anode of the diode array 41 is connected to the drain of transistor MPO and the cathode thereof is connected to the source of transistor MPO and also connected in series with switch transistor MIS which is controlled by input terminal COLI.

The diode array 41 is comprised by at least one diode. In this embodiment, there are two diodes connected in series. In the CMOS manufacturing process, the diode array is preferably implemented by serially-connected diodes manufactured by NMOS or PMOS transistors, as show in the figure.

Figure 5:
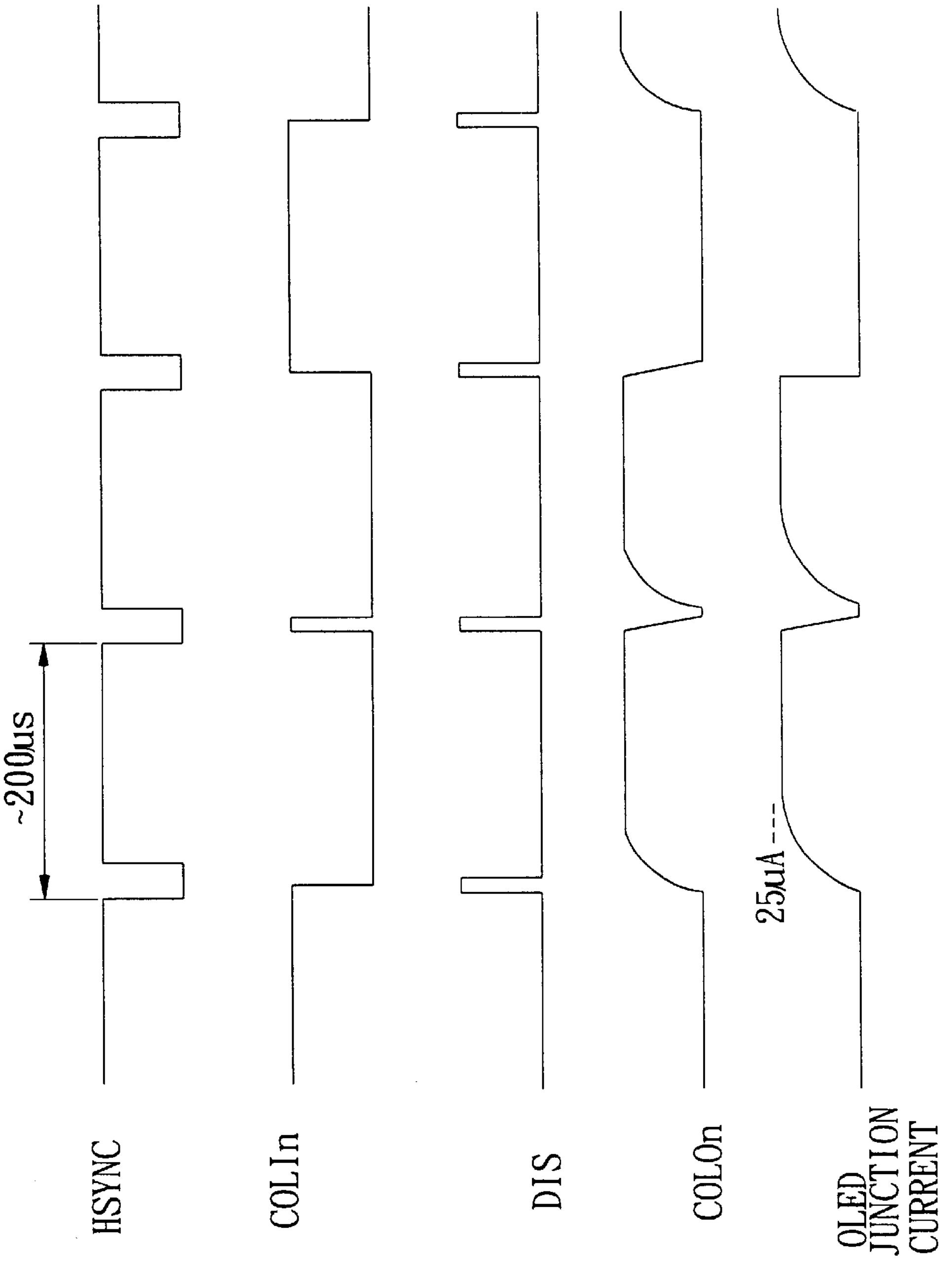
FIG. 5 depicts the driving waveforms of the circuit shown in FIG. 4.

Also with reference to the driving waveforms shown in FIG. 5, the output current of constant current driver cell 11 is controlled by the corresponding column data to output current. If there is current to be output, PMOS transistor MPO will output a constant current of 25 $\mu$A. At this moment, the voltage of driven OLED 13 is still 0V, low voltage or even negative voltage. Hence, the diode array consisting of PMOS transistors MPST1 and MPST2 will be turned on for providing an additional large current for rapidly pre-charging the OLED 13 to be driven. Thus, voltage $V_{OLED}$ is rapidly charged until voltage $V_{DS\_MPO}$ at the diode array 41 is smaller than the cut-in voltage of the diode array 41. At this moment, the pre-charging circuit is disabled. That is, a clamping operation on the pre-charging circuit is automatically occurred. As a result, only 25 $\mu$A constant current from transistor MPO is used to drive the corresponding OLED 13 and stray capacitor.

With reference to FIG. 4 again, it is also applicable to use a multiplexer 15 as a single-pole double-throw switch for bias control in this embodiment. The multiplexer 15 is connected between the bias output terminal VB of the reference bias generator 12 of the column driving circuit 10 and the gates of transistors MNST and MPO of the constant current driver cell 11, so as to configure the circuit to be a constant current driving mode or a constant voltage driving mode. Therefore, the user may select a desired operating mode of the driver in accordance with the present invention depending on a specific application, thereby achieving the maximum benefits with the minimum cost.

Figure 6:
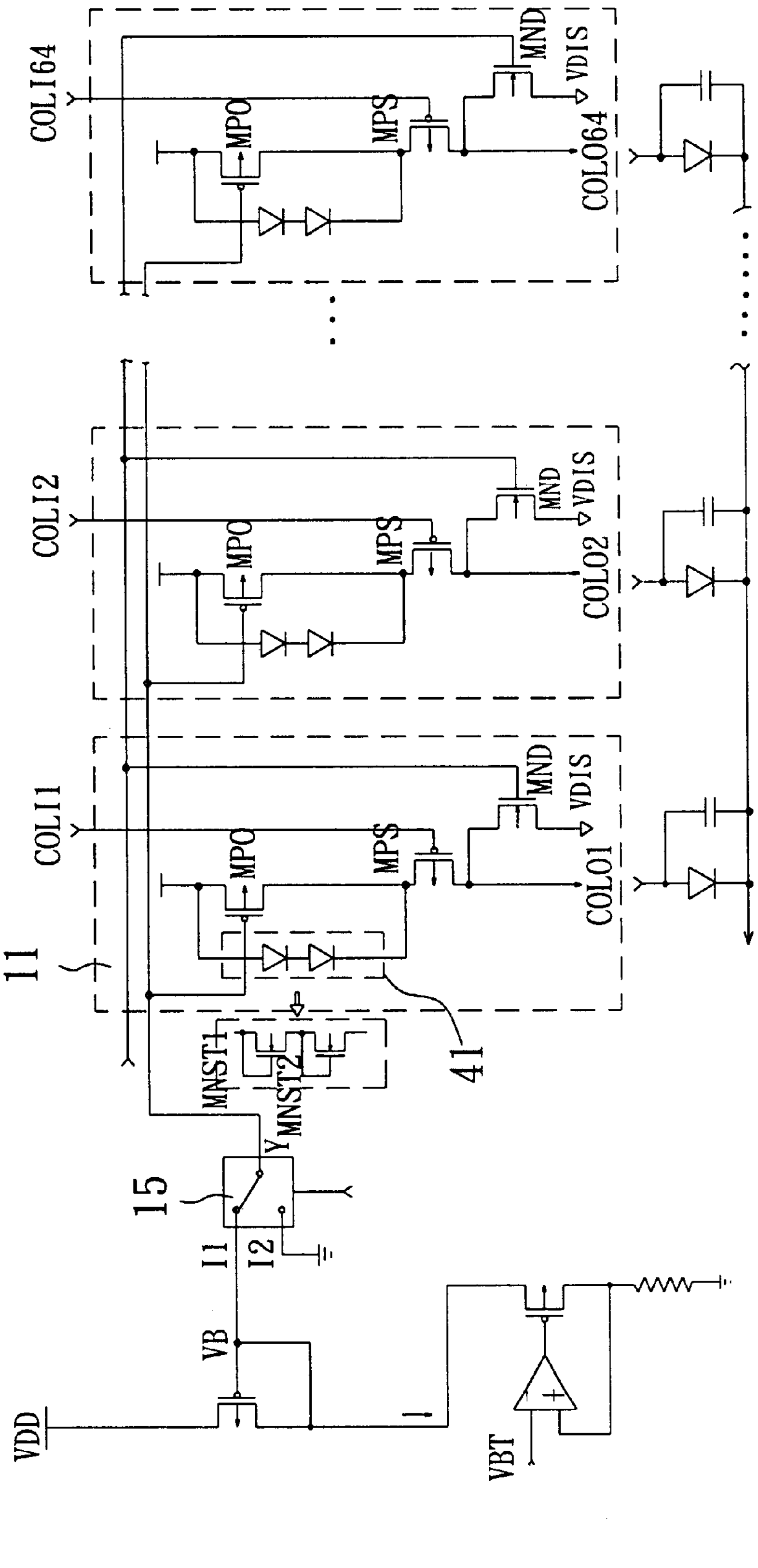
FIG. 6 is a circuit diagram of a fourth preferred embodiment of constant current driver with auto-clamped pre-charge function in accordance with the present invention.

FIG. 6 is a circuit diagram of a fourth preferred embodiment of the constant current driver with auto-clamped pre-charge function in accordance with the present invention, which is similar to the previous embodiment except that the PMOS switch transistor MPS is connected between the connection point of the anode of the diode array 41 and the drain of transistor MPO, and the driving output terminal COLO. That is, the source of transistor MPO is connected to the supplied voltage $V_{DD}$, the drain thereof is connected to the source of transistor MPS, and the gate thereof is connected to the bias output terminal of the reference bias generator 12. Furthermore, the gate of transistor MPS is connected to the input terminal COLI and the drain thereof is served as a constant current output terminal COLO. Moreover, the source of transistor MND is connected to the drain of transistor MPS, the drain thereof is connected to the discharge voltage $V_{DIS}$, and the gate thereof is served as a discharge control terminal DIS. In addition, the cathode of the diode array 41 is connected to the source of transistor MPO and the anode thereof is connected to the drain of transistor MPO. With Such a configuration, the fourth embodiment can obtain the same advantages as the previous one.

Figure 7:
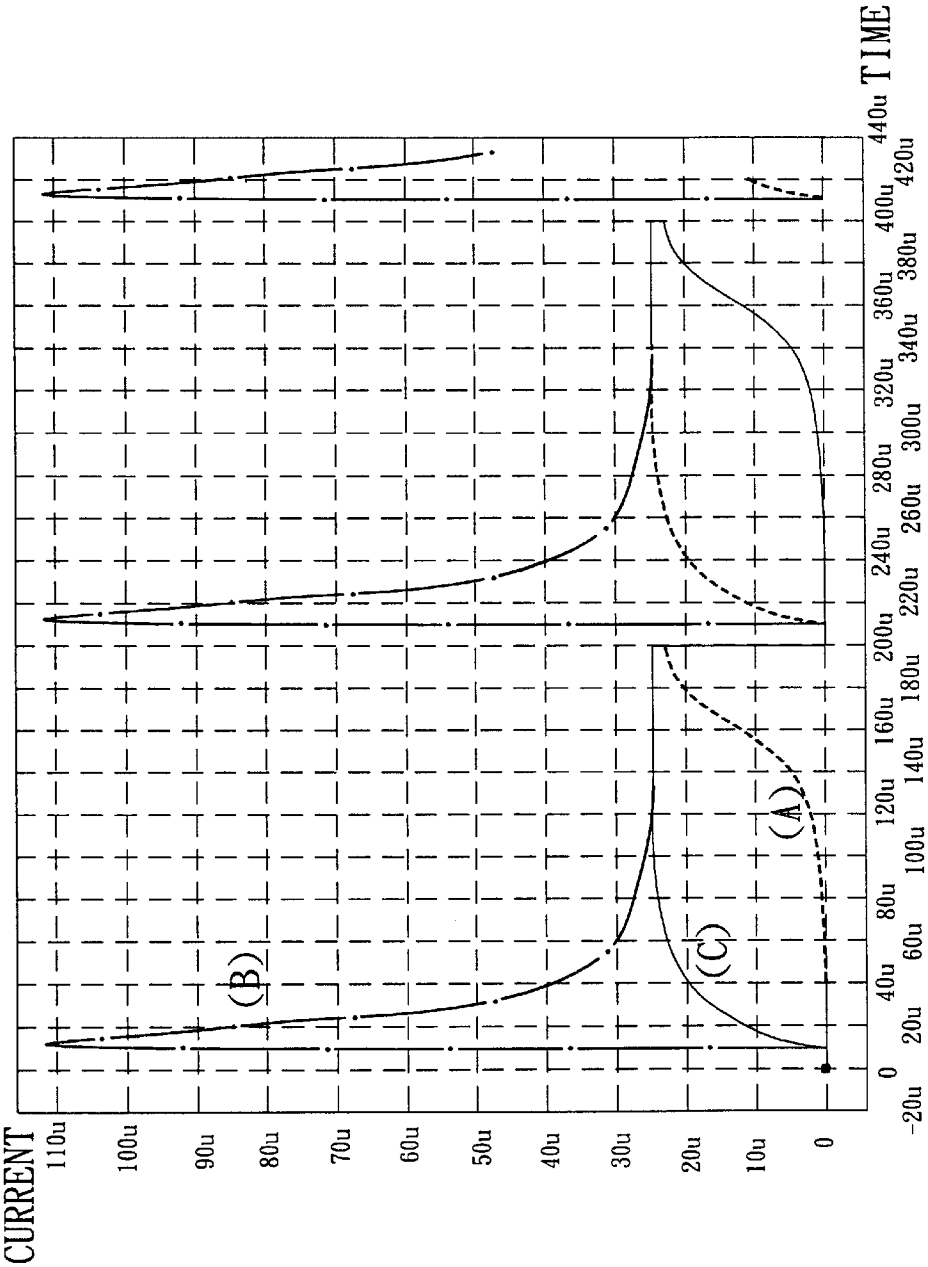
FIG. 7 shows the waveforms of the OLED junction currents of the present driver and the conventional drivers.
Figure 8:
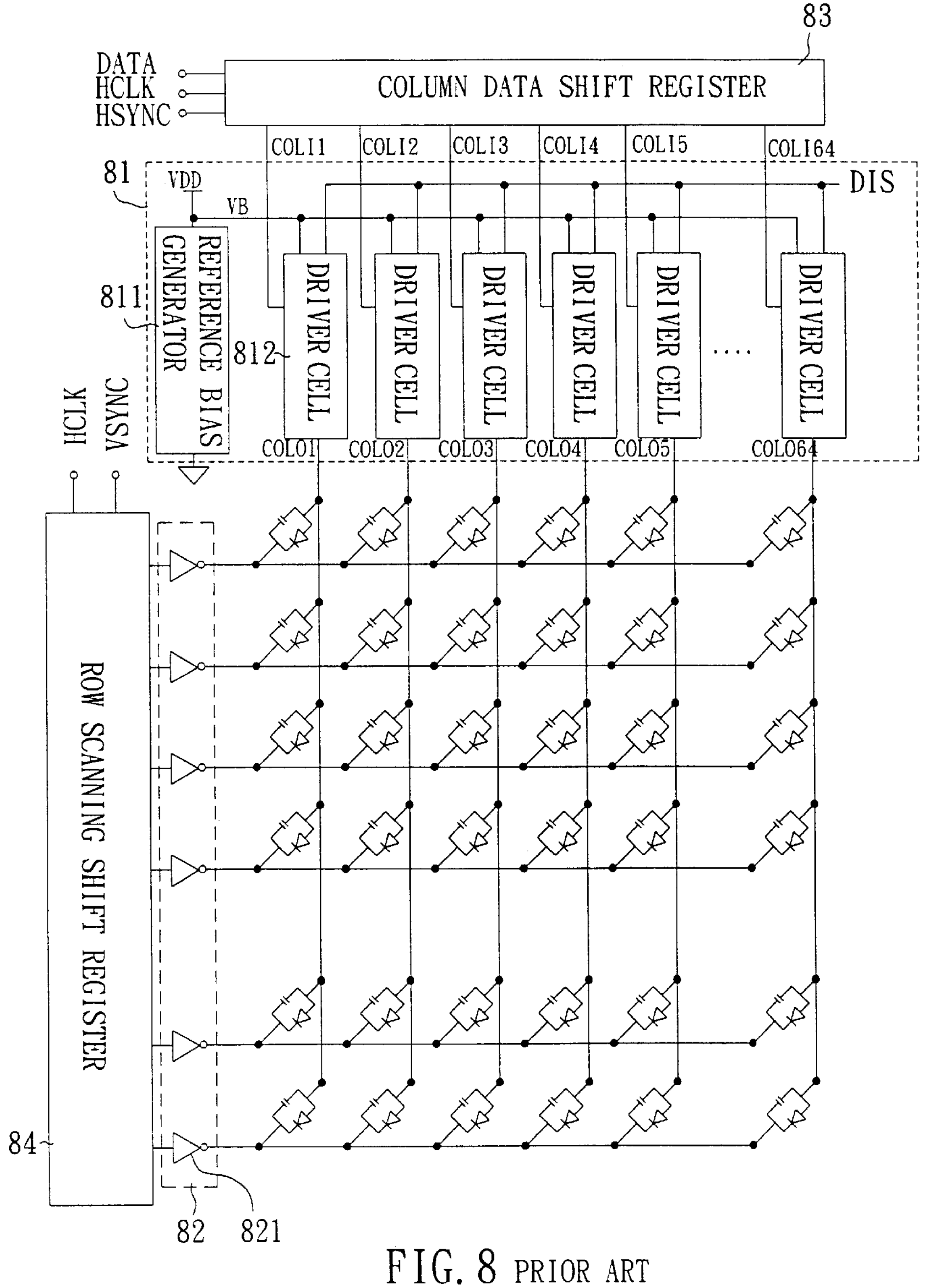
FIG. 8 PRIOR ART
FIG. 8 is a schematic diagram of the conventional OLED display panel driven by a constant current driving circuit.
Figure 9:
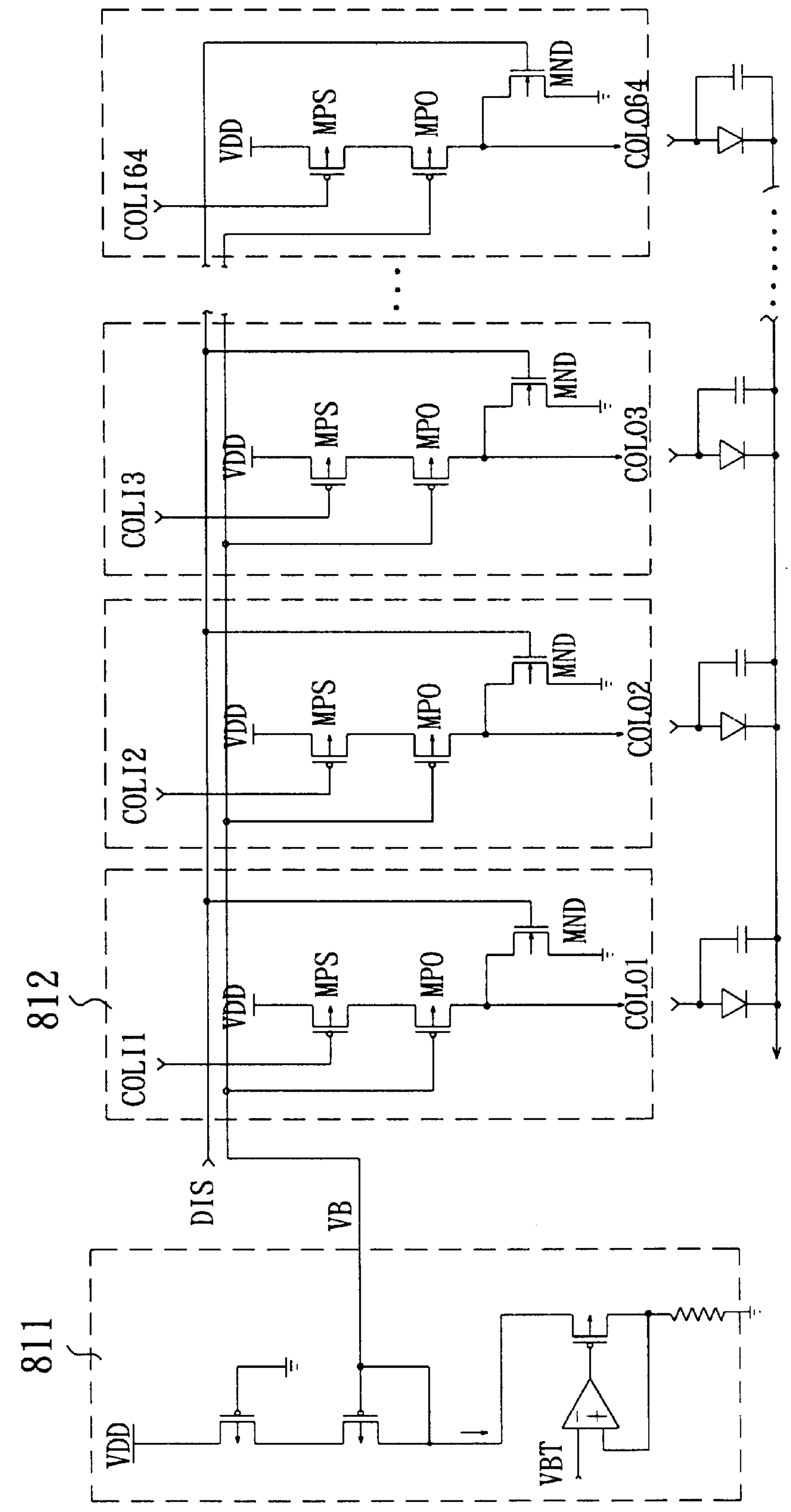
FIG. 9 PRIOR ART
FIG. 9 is a circuit diagram of the conventional constant current driving circuit for OLED display panel.
Figure 10:
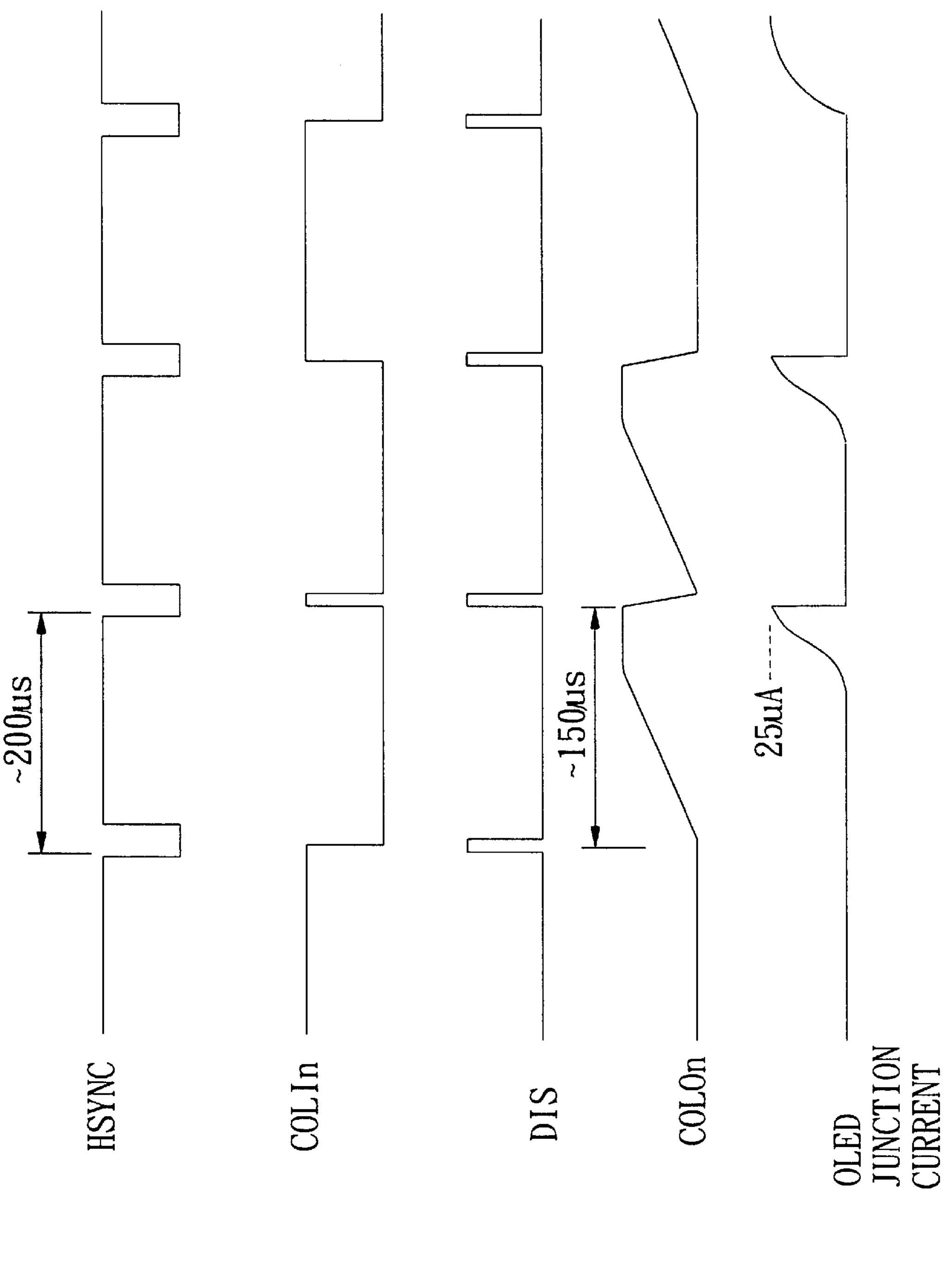
FIG. 10 PRIOR ART
FIG. 10 depicts the driving waveforms of the circuit shown in FIG. 9.
Figure 11:
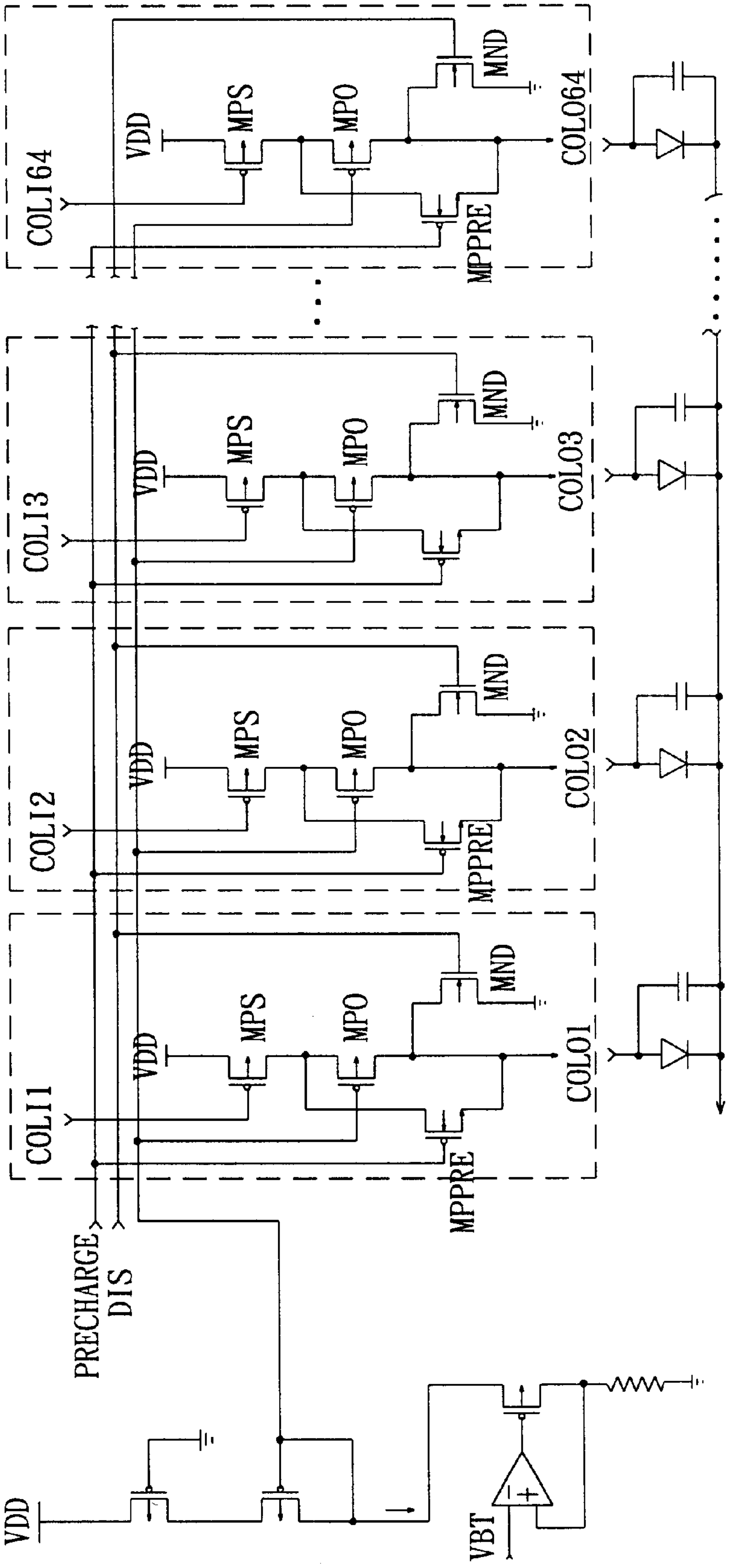
FIG. 11 PRIOR ART
FIG. 11 is a circuit diagram of the conventional constant current driving circuit for OLED display panel having pre-charge function.
Figure 12:
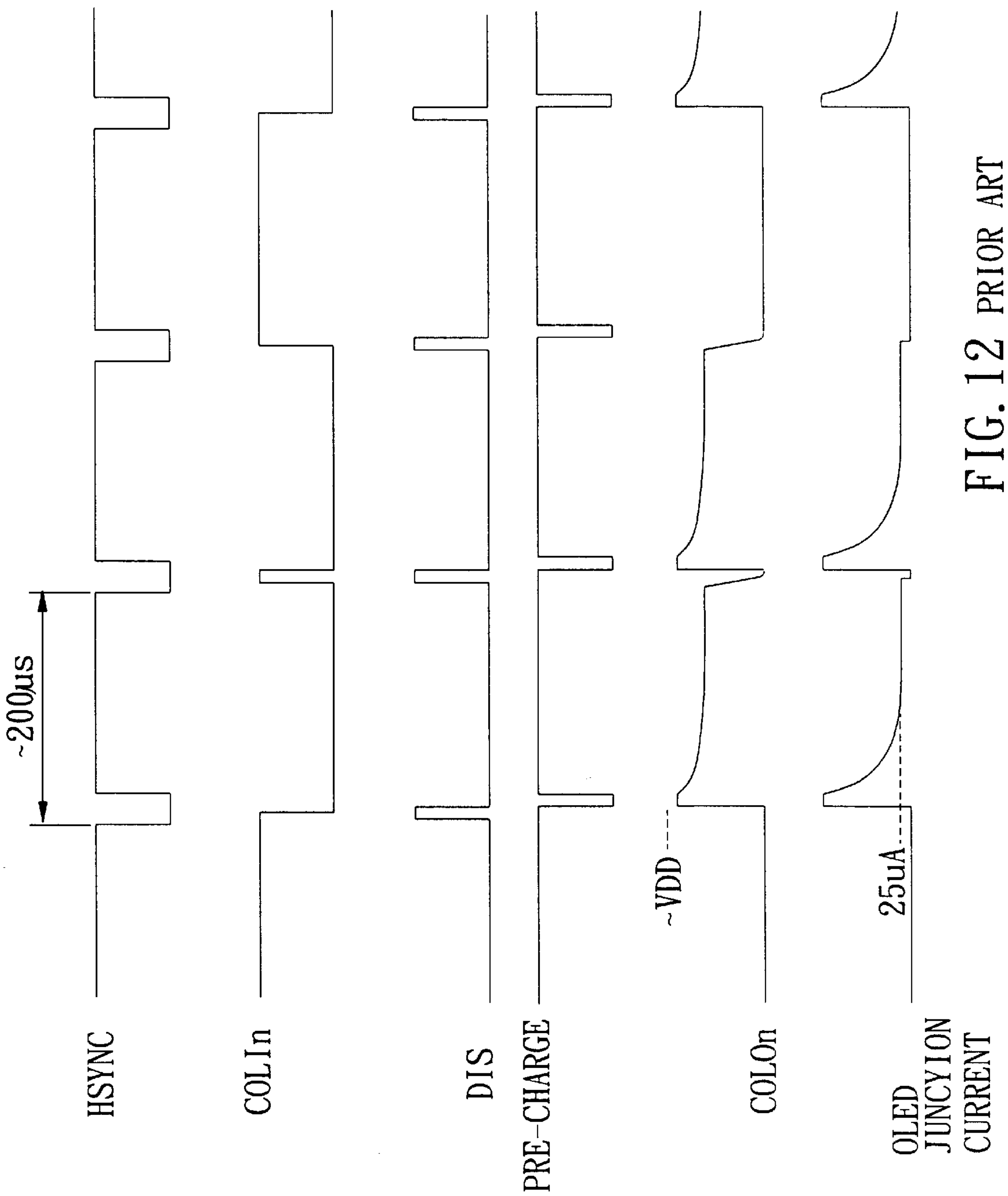
FIG. 12 PRIOR ART
FIG. 12 depicts the driving waveforms of the circuit shown in FIG. 11.

In view of the foregoing, the constant current driver with auto-clamped pre-charge function in accordance with the present invention is implemented by utilizing an NMOS transistor MNST as a source follower, which is connected with transistor MPO in parallel for being used as a pre-charging device. Thus, it is able to automatically adjust the pre-charging current based on the voltage of OLED, and further automatically clamp the voltage to a level of $VB-Vth_{\_MNST}$ ($Vth_{\_MNST}$ denotes the threshold voltage of transistor MNST) for preventing the voltage from being over-charged. Alternatively, a diode array is connected to the constant current output transistor MPS in parallel for being used as a pre-charging device. Similarly, it is able to automatically adjust the pre-charging current based on the voltage of OLED, and further automatically disable the pre-charging circuit when $V_{DS\_MPO}$ ($V_{DS\_MPO}$ denotes the drain to source voltage of transistor MPO) is smaller than the cut-in voltage of the diode array for preventing the voltage from being over-charged. Therefore, an independent pre-charging control signal as required in the prior art is eliminated by the present invention, so as to avoid all the drawbacks in the prior art. FIG. 7 shows the waveform of the junction current of OLED for the driving circuit of the present invention, as denoted by 'C', and those for the conventional driving circuits without and with pre-charging function, as denoted by 'A' and 'B', respectively. By comparing these waveforms, it is appreciated that the present invention does provide better performance and can achieve the desired object.

Although the present invention has been explained in relation to its preferred embodiment, it is to be understood that many other possible modifications and variations can be made without departing from the spirit and scope of the invention as hereinafter claimed.

What is claimed is:

1. A constant current driver with auto-clamped pre-charge function, comprising:

a reference bias generator having a bias output terminal for providing a reference bias; and a plurality of constant current driver cells, each being connected to the reference bias generator to form a respective current mirror, wherein each constant current driver cell comprises:

a switch transistor controlled by an input terminal for being turned on or off;

a current output transistor connected to the switch transistor and the bias output terminal of the reference bias generator for outputting a constant current when the switch transistor is on; and a pre-charge transistor having a gate connected to the gate of the current output transistor and further connected to the bias output terminal of the reference bias generator, a drain and a source connected to the drain and source of the current output transistor, respectively, whereby, when a constant current is outputted from the current output transistor for driving an organic light emitting diode, the pre-charge transistor is turned on due to the gate to source voltage thereof being larger than its threshold voltage, so as to provide a drain to source current as an additional large current for rapidly pre-charging the organic light emitting diode until the gate to source voltage of the pre-charge transistor is smaller than the threshold voltage.

2. The constant current driver with auto-clamped pre-charge function, as claimed in claim 1, further comprising a multiplexer connected between the bias output terminal of the reference bias generator and the gates of the pre-charge transistor and the current output transistor of each of the constant current driver cells, the multiplexer having a first and a second input terminals connected to the bias output terminal of the reference bias generator and ground, respectively, and an output terminal connected to the gates of the pre-charge transistor and the current output transistor.

3. The constant current driver with auto-clamped pre-charge function as claimed in claim 1, wherein the constant current driver cell further comprises a discharge transistor connected to the current output transistor for discharging when the discharge transistor is turned on.

4. The constant current driver with auto-clamped pre-charge function as claimed in claim 3, wherein the switch transistor and the current output transistor are PMOS transistors and the discharge transistor and the pre-charge transistor are NMOS transistors.

5. The constant current driver with auto-clamped pre-charge function as claimed in claim 4, wherein the switch transistor has a source connected to a supplied voltage, a drain connected to the source of the current output transistor, and a gate connected to the input terminal; the gate of the current output transistor is connected to the bias output terminal of the reference bias generator and the drain thereof is used as a constant current output terminal; the drain of the discharge transistor is connected to the drain of the current output transistor, the source thereof is grounded, and the gate thereof is used as a discharge control terminal.

6. The constant current drive with auto-clamped pre-charge function as claimed in claim 4, wherein the current output transistor has a source connected to a supplied voltage, a drain connected to the source of the switch transistor, and a gate connected to the bias output terminal of the reference bias generator; the gate of the switch transistor is connected to the input terminal, and the drain thereof is used as the constant current output terminal; the drain of the discharge transistor is connected to the drain of the switch transistor, the drain thereof is grounded, and the source thereof is used as the discharge control terminal.

7. A constant current driver with auto-clamped pre-charge function comprising:

a reference bias generator having a bias output terminal for providing a reference bias; and a plurality of constant current driver cells, each being connected to the reference bias generator to form a respective current mirror, wherein each constant current driver cell comprises:

a switch transistor controlled by an input terminal for being turned on and off;

a current output transistor connected to the switch transistor and the bias output terminal of the reference bias generator; and a diode array having an anode and a cathode connected to the drain and the source of the current output transistor, respectively, wherein when a constant current is outputted from the current output transistor to drive an organic light emitting diode, the diode array is turned on for providing an additional large current to rapidly pre-charge the organic light emitting diode until the voltage of the diode array is smaller than its cut-in voltage.

8. The constant current driver with auto-clamped pre-charge function as claimed in claim 7, wherein the diode array is comprised of one diode or more than one diodes connected in series.

9. The constant current driver with auto-clamped pre-charge function as claimed in claim 8, wherein the diode array includes at least one diode formed by NMOS or PMOS transistor.

10. The constant current driver with auto-clamped pre-charge function as claimed in claim 7, further comprising a multiplexer connected between the bias output terminal of the reference bias generator and the gates of the pre-charge transistor and the current output transistor of each of the constant current driver cells, the multiplexer having a first and a second input terminal connected to the bias output terminal of the reference bias generator and ground, respectively, and an output terminal connected to the gate of the current output transistor.

11. The constant current driver with auto-clamped pre-charge function as claimed in claim 7, wherein the constant current driver cell further comprises a discharge transistor connected to the current output transistor for discharging the current output transistor when the discharge transistor is turned on.

12. The constant current driver with auto-clamped pre-charge function as claimed in claim 11, wherein the switch transistor and the current output transistor are PMOS transistors and the discharge transistor is an NMOS transistor.

13. The constant current driver with auto-clamped pre-charge function as claimed in claim 10, wherein the switch transistor has a source connected to a supplied voltage, a drain connected to the source of the current output transistor, and a gate connected to the input terminal; the gate of the current output transistor is connected to the bias output terminal of the reference bias generator and the drain thereof is used as a constant current output terminal; the drain of the discharge transistor is connected to the drain of the current output transistor, the source thereof is grounded, and the gate thereof is used as a discharge control terminal.

14. The constant current driver with auto-clamped pre-charge function as claimed in claim 10, wherein the source of the current output transistor is connected to the supplied voltage, the drain thereof is connected to the source of the switch transistor, and the gate thereof is connected to the bias output terminal of the reference bias generator; the gate of the switch transistor is connected to the input terminal, and the drain thereof is used as the constant current output terminal; the drain of the discharge transistor is connected to the drain of the switch transistor, the source thereof is grounded, and the gate thereof is used as the discharge control terminal.

* * * * *